(12) United States Patent
Kelly

(10) Patent No.: US 8,602,719 B2
(45) Date of Patent: Dec. 10, 2013

(54) VERTICAL AXIS WIND TURBINE

(75) Inventor: Samuel Thomas Kelly, San Marcos, CA (US)

(73) Assignee: AF Energy Corporation, Minnetonka, MN (US)

( * ) Notice: Subject to any disclaimer, the term of this patent is extended or adjusted under 35 U.S.C. 154(b) by 0 days.

(21) Appl. No.: 13/541,382

(22) Filed: Jul. 3, 2012

(65) Prior Publication Data
US 2012/0269629 A1 Oct. 25, 2012

Related U.S. Application Data

(63) Continuation of application No. 12/148,875, filed on Apr. 22, 2008, now abandoned.

(60) Provisional application No. 60/989,877, filed on Nov. 23, 2007.

(51) Int. Cl.
*F03D 7/06* (2006.01)

(52) U.S. Cl.
USPC .............. 415/4.2; 415/4.4; 415/907; 416/13; 416/17; 416/24; 416/41; 416/108; 416/111; 416/112; 416/119

(58) Field of Classification Search
USPC ............ 415/4.2, 4.4, 907; 416/13, 17, 24, 41, 416/108, 111, 112, 119
See application file for complete search history.

(56) References Cited

U.S. PATENT DOCUMENTS

| | | | | | |
|---|---|---|---|---|---|
| 591,775 | A | * | 10/1897 | Peterson | 416/13 |
| 618,807 | A | * | 1/1899 | Staplin et al. | 416/17 |
| 961,766 | A | * | 6/1910 | Folger | 416/17 |
| 1,465,593 | A | * | 8/1923 | Barrett et al. | 416/14 |
| 1,964,347 | A | * | 6/1934 | Ford | 416/17 |
| 4,383,801 | A | * | 5/1983 | Pryor | 416/17 |
| 4,494,007 | A | * | 1/1985 | Gaston | 290/44 |
| 4,507,049 | A | * | 3/1985 | Strandgren | 416/51 |
| 4,764,090 | A | * | 8/1988 | Danson | 416/17 |
| 5,676,524 | A | * | 10/1997 | Lukas | 416/17 |

* cited by examiner

*Primary Examiner* — Igor Kershteyn
(74) *Attorney, Agent, or Firm* — Fish & Richardson P.C.

(57) ABSTRACT

A vertical axis wind turbine having a plurality of upright airfoils pivotally engaged. A continuous adjustment of the angle of attack of the airfoils to oncoming wind is provided by rotation of a control plate connected to the vanes which are mounted upon a rotating drive plate. A vane can be employed to rotate the control plate to affect the continuous adjustment of the airfoils.

15 Claims, 5 Drawing Sheets

VERTICAL AXIS WIND TURBINE

CROSS-REFERENCE TO RELATED APPLICATIONS

This application is a continuation of U.S. application Ser. No. 12/148,875, filed Apr. 22, 2008, which claims priority from U.S. Provisional Patent Application Ser. No. 60/989,877 filed Nov. 23, 2007 and incorporated in its entirety by reference herein.

FIELD OF THE INVENTION

The disclosed device relates to wind turbines. More particularly the disclosed device and method of employment thereof relate to a vertical axis wind turbine having a pitch control enabling use of the device under light wind conditions and which is enclosed to provide shielding from the hazards of weather exposure.

BACKGROUND OF THE INVENTION

A wind turbine is a machine that converts the kinetic energy from the wind, into mechanical energy. Such mechanical energy when captured by a wind turbine may be employed to drive machinery using the abundantly available wind. Generally, if the captured mechanical energy is employed directly to drive machinery such as a pump, the device is called a windmill and if the mechanical energy is employed to drive a generator or alternator the device is called a wind turbine.

The most familiar wind turbines to the general public are windmills which are essentially horizontal-axis wind turbines which have the main rotor shaft engaged to blades which are situated at the distal end of a large and tall tower. The blades are engaged to the rotor at a substantially perpendicular angle and in order to spin the rotor the blades must be pointed in a direction into the wind. Smaller windmill type turbines are constantly redirected into the windstream by a simple wind vane. Larger windmills or horizontal axis turbines being heavier generally employ a wind sensor coupled to a motor to constantly reposition the blades to intersect the windstream driving them. Since a tower produces turbulence behind it, the turbine is usually pointed upwind of the tower to avoid it. The rotor is usually engaged to a gear box which communicates the force of the turning blades to machinery such as a generator or alternator which is turned to generate electricity.

Horizontal axis style turbines have a number of disadvantages. First they have difficulty operating in the light winds near the ground and must be elevated and employ tall towers able to support the force of the wind against long blades. Such structures while appearing attractive to an engineer are generally not well received by the public who consider them an eyesore. Further because of their height and weight, horizontal axis turbines are difficult to install and maintain.

Vertical axis wind turbines on the other hand, have the main rotor shaft running vertically. This arrangement has a key advantage over the horizontal axis turbine in that the generator and/or gearbox can be placed at the bottom, near the ground so the tower doesn't need to support it. Further, vertical axis turbines do not require the very large blades and tall tower to support them and the blades do not need to be constantly repositioned to point into the wind.

Power for vertical-axis wind turbines is generally provided by wind acting against the plurality of wing-shaped blades and the lift created by the wind passing over the surfaces thereof. One surface being longer than the other will create a lifting force as the wind traverses and accelerates to reach the rear of the blade at the same time as the wind traveling over the shorter surface. The lift created is perpendicular to the direction of the wind and therefore it is advantageous to reposition each blade to maximize lift during traverse through the airstream and minimize drag when rotated out of a perpendicular encounter with the same airstream.

Current drawbacks to vertical axis wind turbines are caused by the fact that the torque developed by the multiple blades usually pulsates in strength due to the combination of wind force on some blades and drag created when other blades rotate into the wind. It is also difficult to mount vertical-axis turbines on tall towers meaning they must operate in the often slower and more turbulent air flow near the ground. Under current designs for such vertical axis turbines these considerations can result in a much lower energy extraction efficiency.

However, since they operate closer to the ground and are simpler to assemble and install, vertical axis wind turbines are much easier to employ on a small scale to power homes and small businesses. Additionally, they do not present the large eyesore that conventional horizontal axis wind turbines exhibit. Finally, vertical axis wind turbines are much safer for wildlife such as birds which frequently fall prey to the large rotating blades of horizontal axis wind turbines since the low-positioned smaller blades are not encountered by unsuspecting wildlife in flight.

As such there is an unmet need for au improved design for a vertical axis wind turbine to allow wider employment of such devices to produce energy. Such an improved design should overcome the drawbacks of conventional devices by minimizing the torque fluctuation as the vanes circle the axis. Such an improved design should maximize the power captured from the winds blowing low to the ground. Further, such a device should provide a sheltered mechanism to prevent the deleterious effects of weather exposure and to provide convenient access for surfacing from the ground from below the turbine body.

In this respect, before explaining at least one embodiment of the invention in detail it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for designing other vertical-axis wind turbines and methods and systems for carrying out the several purposes of the present invention. It is important, therefore, that the claims be regarded as including such equivalent construction insofar as they do not depart from the spirit and scope of the present invention.

An object of this invention is the provision of a vertical-axis wind turbine that optimizes blade positioning relative to the windstream to maximize torque.

A further object of this invention is continual optimization of each blade angle relative to oncoming wind, to maximize the force generated by lift on the respective blades at each position during their rotation around an axis.

An additional object of this invention is the provision of such a vertical-axis wind turbine which employs an airfoil pitch control enabling operation efficiently in light winds.

It is a further object of the invention herein, to provide such a vertical-axis wind turbine which employs operating mechanisms deployed below the rotating airfoils for easy access and housed in a fashion to shield the operating mechanisms from the elements.

These together with other objects and advantages which will become subsequently apparent reside in the details of the construction and operation as more fully hereinafter described and claimed, reference being had to the accompanying drawings forming a part thereof, wherein like numerals refer to like parts throughout.

SUMMARY OF THE INVENTION

The device and method of operation herein described and disclosed features a vertical-axis turbine having a substantially upright shaft which is rotatable about a vertical main axis defined by the center axis of the shaft. A plurality of radially supported and substantially upright airfoils are pivotally engaged to support members which project from a main plate and which rotate around a central or main axis.

A planar control plate is rotatably engaged in a substantially synchronous rotation about a virtual axis which is parallel to the main axis. This offset rotation of the control plate from which adjustment members extend to a rotational engagement with the airfoils, provides a means to continuously control the pitch of the rotating plurality of airfoils to adjust them to an optimum angle of attack relative to the windstream at all points around the main axis to thereby maximize lift generated by each airfoil at each point in rotation around the main axis.

The physical control plate axis is replaced by a virtual axis defined by a set of idlers. The control plate is operatively engaged to the main shaft by means for ratio-equalization such as a ratio-equalizing chain drive and/or reducing gears or an equivalent means to thereby continually synchronize the rotation of the control plate rotation with that of the main plate engaged to the support members.

A base plate is positioned rotatorily, by the wind acting thereon, and also anchors the linkage between the drive shaft and the control plate which connects to control members engaged to the airfoils to thereby continually align the airfoils with respect to the wind. An angular displacement is employed to retard or advance rotation of the control plate with respect to the main drive, thereby providing a means to adjust each operative airfoil angle of attack continually to one optimum to the windstream driving the airfoil and passing over airfoils in front, to thereby develop a substantially constant torque producing power from the windstream.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing description and following detailed description are considered as illustrative only of the principles of the invention. Further, because of the disclosure herein, numerous modifications and changes will readily occur to those skilled in the art. It is not desired to limit the invention to the exact construction and operation shown and described, and accordingly, all suitable modifications and equivalents which may occur to those skilled in the art are considered to fall within the scope of the invention.

DETAILED DESCRIPTION OF THE INVENTION

Figure 1:
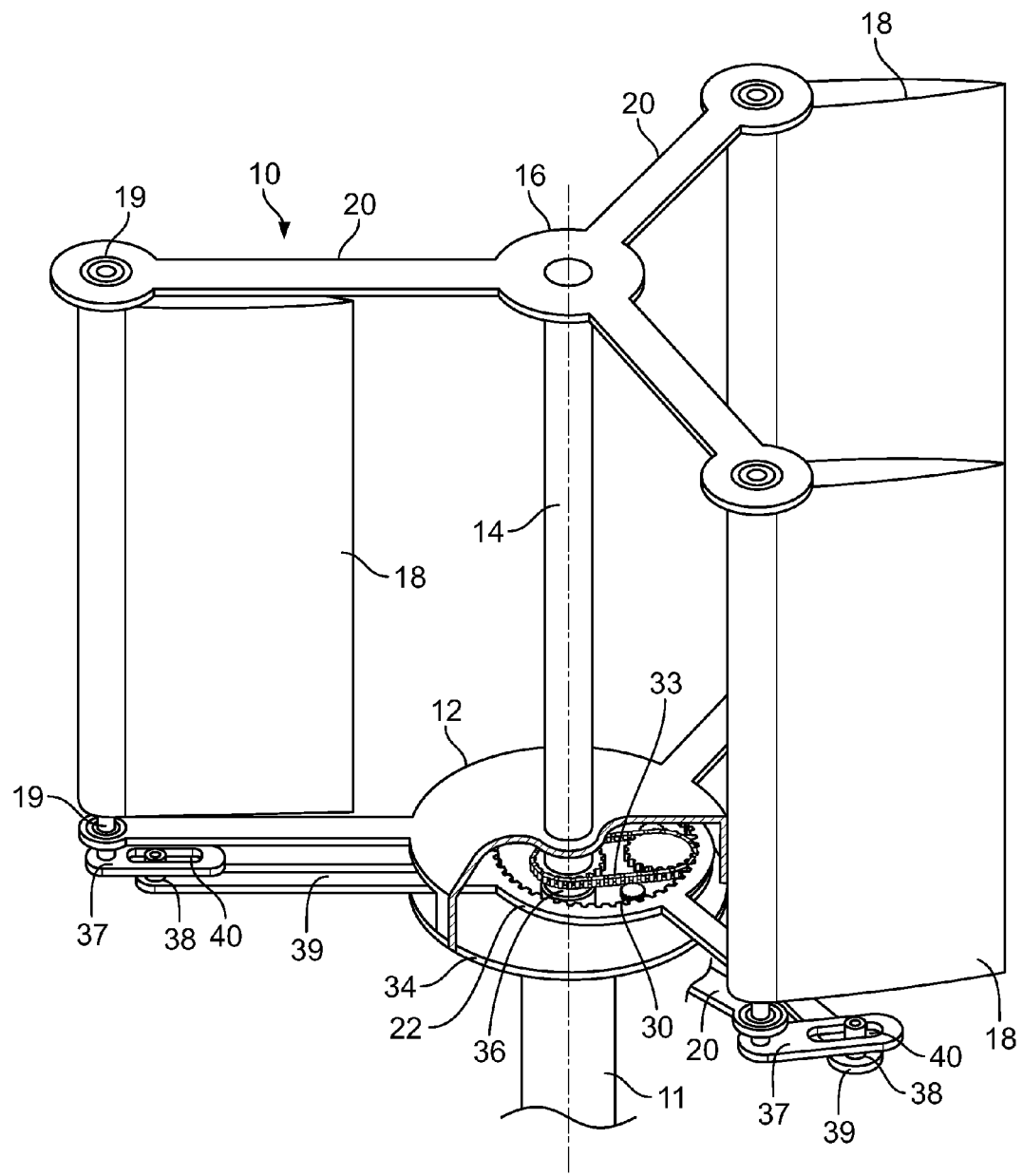
FIG. 1 shows a perspective of the vertical-axis wind turbine device herein with a partial cut-away view of the main plate showing a chain engaged synchronization mechanism.

Referring now to the drawings depicting the device 10 in FIGS. 1-7, wherein similar parts are identified by like reference numerals, as noted in FIG. 1 it shows a perspective view of the device 10 with a cut-away portion of the main plate 12 elevated on a support member 11 or other means for support of the main plate 12.

The device and method of operation herein described and disclosed features a vertical-axis turbine having a substantially upright main shaft 14 which is rotatable about a vertical first or main axis 16 shown in the drawings as an extension of the center axis of the main shaft 14. A plurality of radially positioned and substantially upright airfoils 18 are pivotally engaged 19 to the main plate 12 which as shown employs support members 20 as a means for pivotal engagement, which project from the main plate 12, which rotates around the main axis 16.

A control plate 22 is rotatably engaged about an interior circumference 33 of the control plate 22 upon idlers 30 engaged on a base plate 34. The control plate 22 rotates in a substantially synchronous rotation with the main plate 12 which rotates about the main axis 16. The control plate 22 rotates about a second or virtual axis 24 shown in FIG. 3, which is located a distance from, and substantially parallel to, the main axis 16. Rotatory adjustment of the relative angular displacement of the control plate 22 in its rotation around the virtual axis 24, while concurrently being maintained in synchronous rotation with the main plate 12 supporting the airfoils 18, is influenced by rotation of the base plate 34 around its axis in either the same direction as the rotation of the main plate 12 or counter to the rotation of the main plate 12. Means for rotation of the base plate 34 to react to the direction of oncoming wind, is depicted as provided by the vane 26, shown in FIG. 2, engaged to the rotatable base plate 34. The force of wind acting on the vane 26 engaged to the base plate 34, causes rotational movement of the base plate 34 toward or counter to the direction of rotation of the main plate 12.

Of course other means to rotate or advance or retard the position of the base plate 34 around the virtual axis 24 may be employed such as a motor acting in concert with a wind direction gauge and servo control for the motor, or other means as would occur to those skilled in the art. However, a current preferred means to rotate the base plate 34 in reaction to the direction of the wind employs the vane 26 engaged to rotate the base plate 34.

Figure 5:
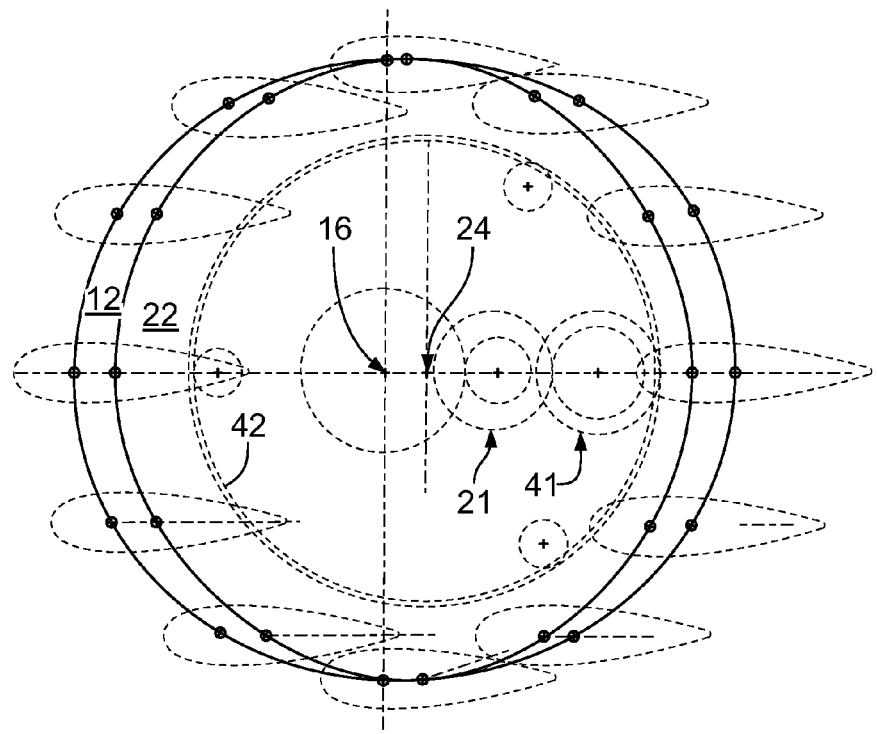
FIG. 5 depicts the displacement of the control plate relative to the rotation of the main plate to position the airfoils in an angle of attack for an idling mode.
Figure 6:
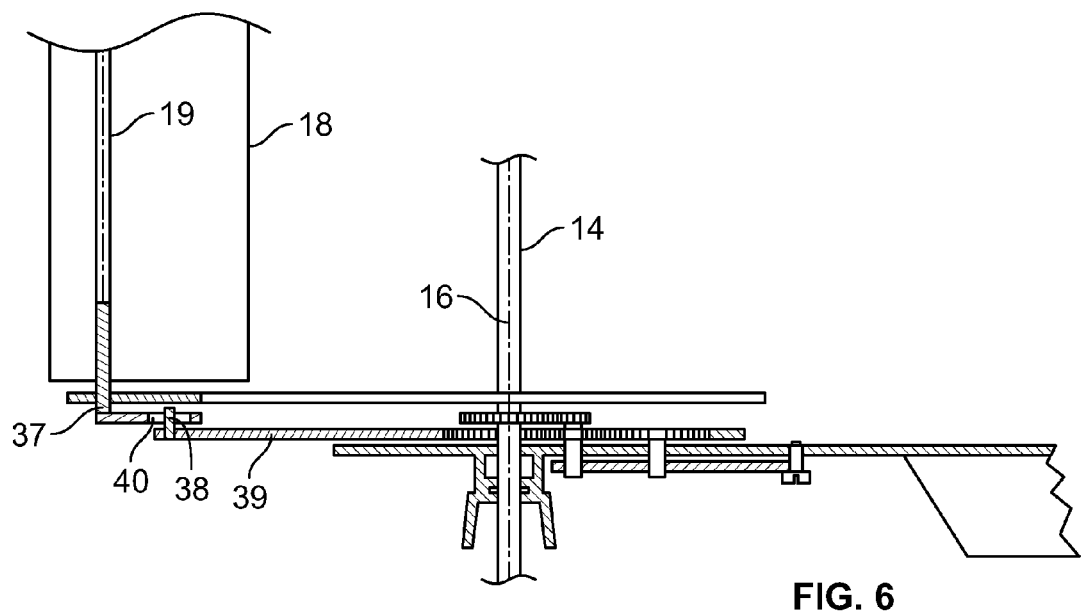
FIG. 6 shows a side cut away view of another mode of the device with a lower mounted vane on the control plate.

During operation, wind action on the vane 26 causes a momentary force by the vane 26 to rotate the base plate 34 and slightly change the angular displacement of the control plate 22 engaged upon the idlers 30 while concurrently rotating around the virtual axis 24 and maintained in substantially synchronous rotation with the main plate 12. This change in position is depicted in FIGS. 5 and 6. A resulting change occurs in the position of the engagement points of the control members 39, shown in FIG. 3, to the rotating control plate 22 relative to the pivots 19 supporting the airfoils 18. This change in angular displacement of the rotating control plate 22, to advance or retard the control plate 22 displacement, relative to the main plate 12, imparts a rotation force to the pivot 19 thereby changing the airfoils 18 angle of attack to oncoming wind relative to the angular displacement of the control plate 22.

This adjustment in position of the base plate 34 to advance or retard the angular displacement of the control plate 22 relative to the main plate 12, thereby provides means for a continual adjustment of the angle of attack of each of the plurality of airfoils 18, at each point in their rotation around the main axis 16, as they pivotally circle on the rotating main plate 12. A continuum change in the attack angle occurs depending on whether each respective airfoil 18 is forward or rearward in position in the rotation around the main axis 16 relative to oncoming wind. Rotation of the base plate 34 thereby provides a means to continuously control the pitch or angle of attack of each of the rotating plurality of airfoils 18 relative to the windstream to achieve optimum lift with resulting optimum torque to the device 10 by all airfoils 18 during their entire trip around the main axis 16. Subsequent angle of attack adjustment during rotation of the airfoils 18 around the main axis 16 is also employed to minimize drag.

The control plate rotation around the virtual axis 24 is provided by engagement of the control plate 22 to a plurality of idlers 30 engaged upon the rotatable base plate 34. As noted, the control plate 22 is operatively engaged to the main shaft 14 by means for ratio-equalization to synchronize the rotations of the control plate 22 and main plate 12. In the current preferred mode of the device 10 the means for ratio-equalization is a reduction gear mechanism 36 shown in FIG. 1, or can also be a ratio-equalizing chain drive 33 depicted in FIG. 1, or an equivalent means to synchronize the rotation of the control plate 22 with the main plate 12 while allowing advance or retard of the control plate 22 angular displacement relative to that of the main plate 12.

Figure 2:
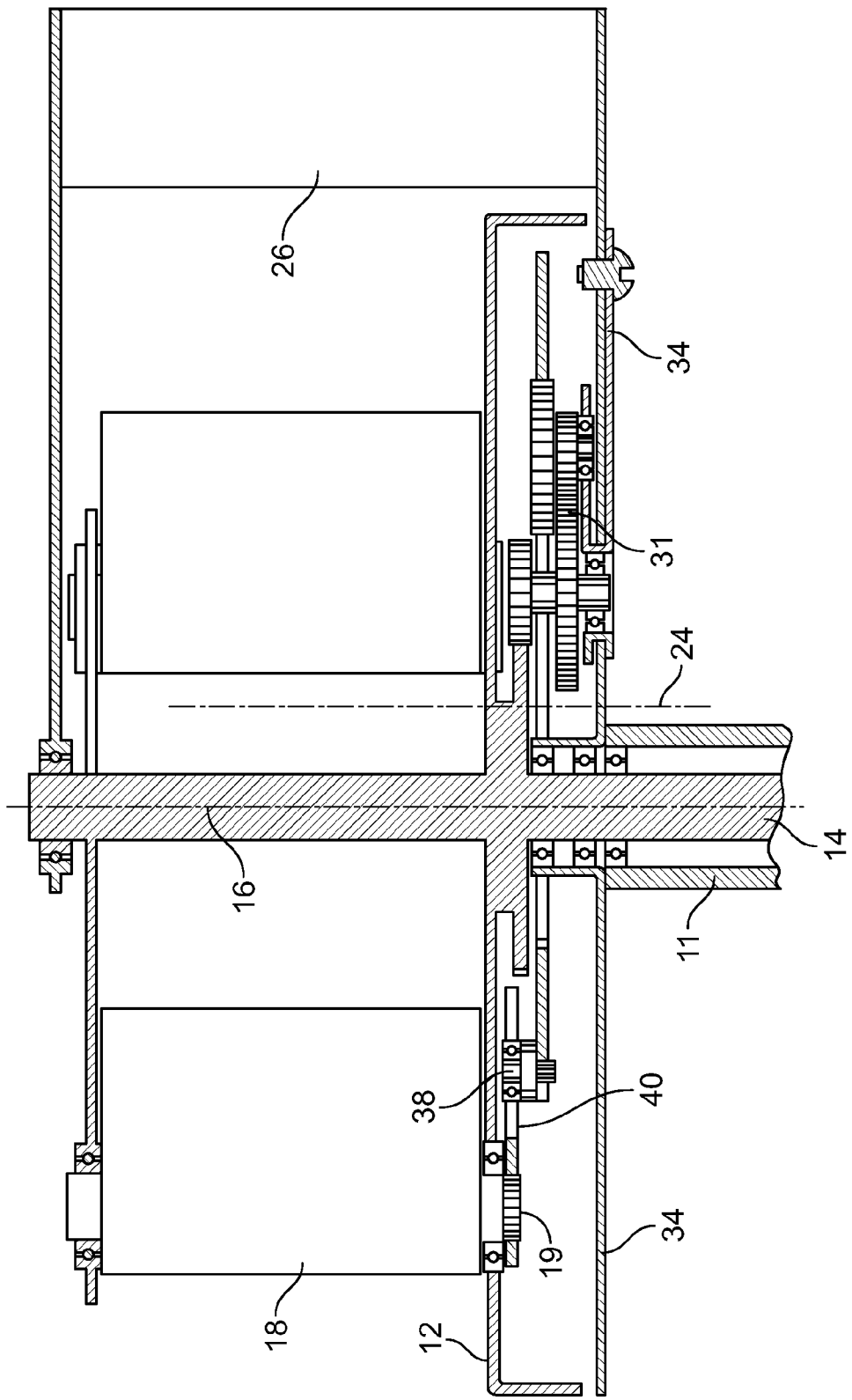
FIG. 2 depicts a side cut away view of the device depicted in FIG. 1 showing the engagement of a preferred geared synchronization mechanism.
Figure 3:
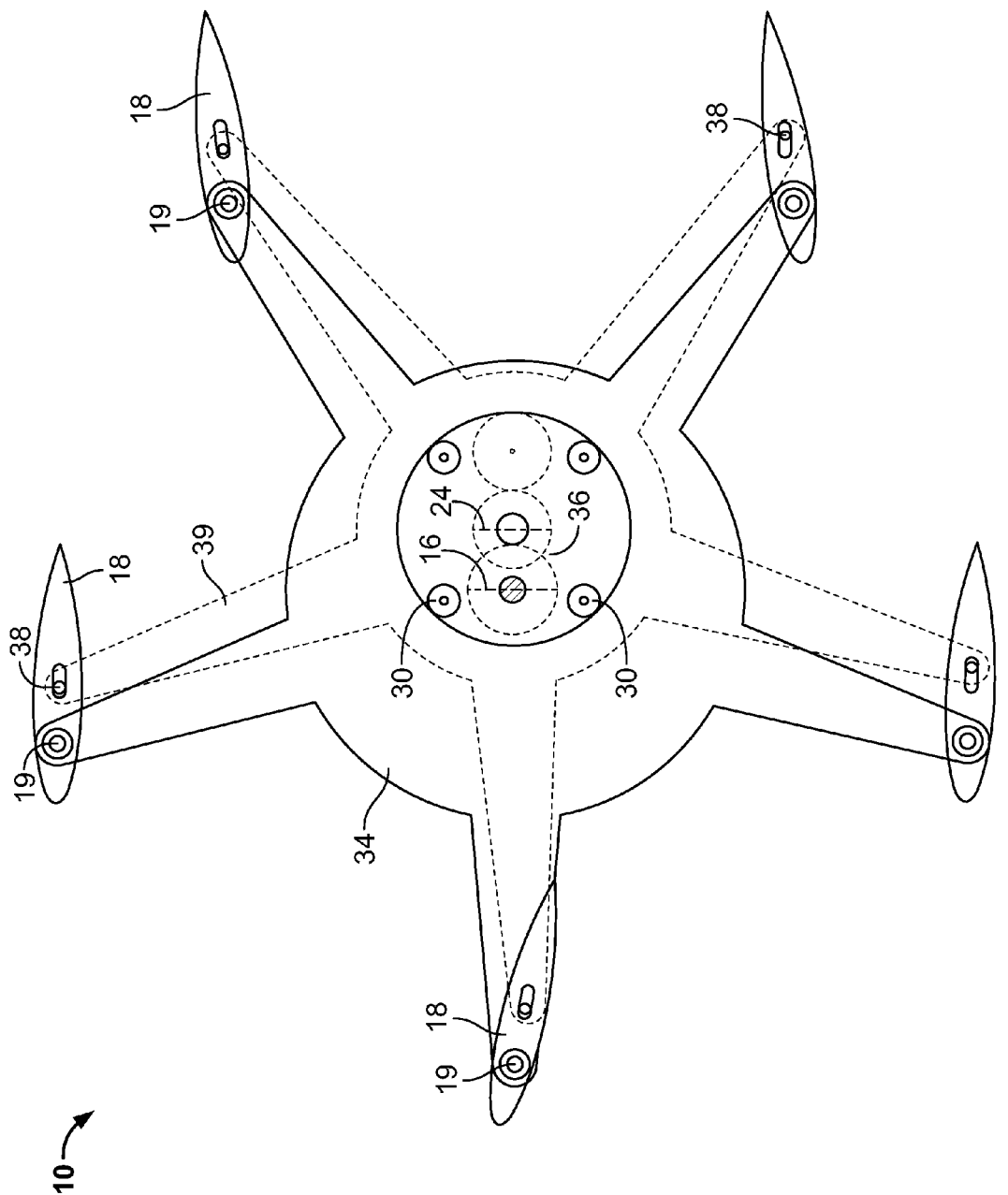
FIG. 3 depicts a top view of a mode of the device herein showing the main plate and control plate rotational axis.
Figure 7:
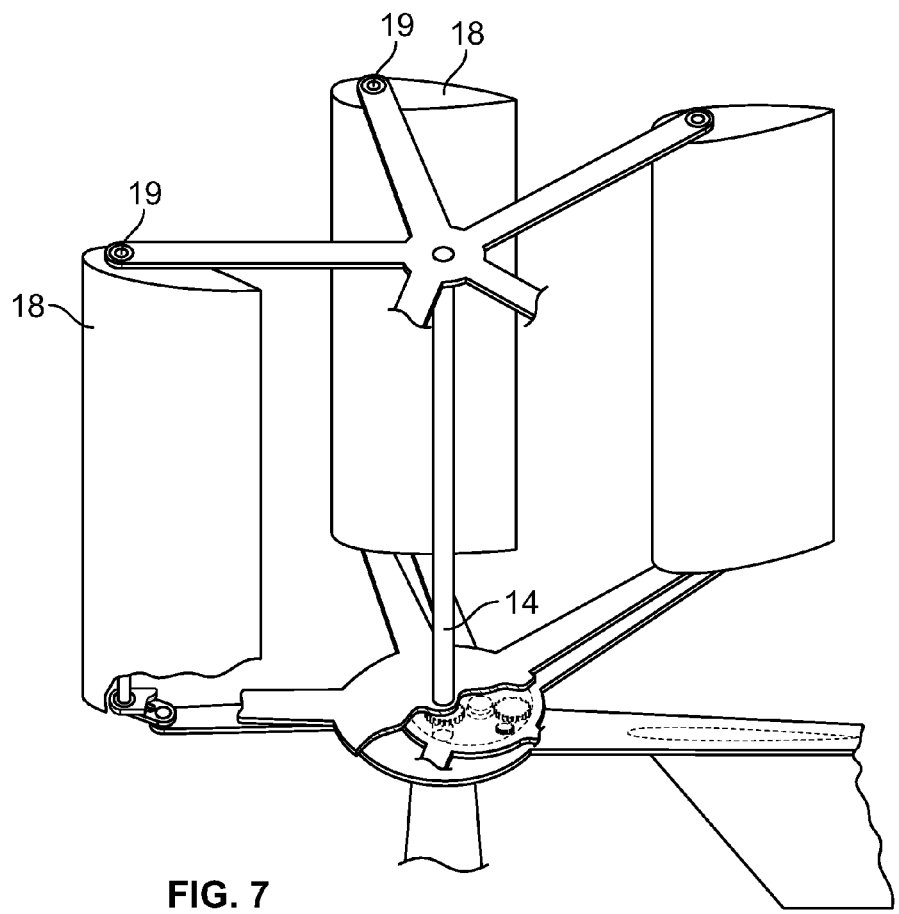
FIG. 7 depicts a mode of the device of FIG. 6 showing a cut away view of the synchronization system around which the control members rotate extending from a control plate rotating on the vane positioned base plate.

As noted, the base plate 34 is directionally positionable which in the current preferred mode is provided by the wind acting on a vane 26 engaged to the base plate 34 as seen in FIGS. 2, 6, and 7. From the control plate 22, a plurality of control members 39 extend and are rotationally engaged with the airfoils 18. Rotation of the base plate 34 by the vane 26 or other means, thus changes the relative rotating positions of the engagement points of the control members 39 relative to the rotating pivots 19 of the airfoils 18 which thereby pivots the airfoils 18 to continuously change the attack angle as they circle the main axis 16 as shown in FIG. 6. The control plate 22 being engaged to the airfoils 18 with extending members 21 thus is able to continually align each airfoils 18 with respect to the wind based on movement from the vane 26 rotating the base plate 34 to advance or retard the control plate 22 axis. This rotational engagement of the airfoils 18 to the control plate 22 is currently served by a slot 40 on a member 39 engaged to the pivot 19 of the airfoils 18 by a pin 38 engaged to the distal ends of the control plate 22 provided by the control members 39.

A specified angular displacement is employed to retard or advance the rotation of the control plate 22 with respect to the concurrent rotation of the main shaft 14 and main plate 12, to thereby provide a means to produce an optimum angle of attack for the airfoils 18, during all points of rotation around the main axis, relative to the windstream oncoming to them, to thereby develop a substantially constant torque for production of power.

Figure 4:
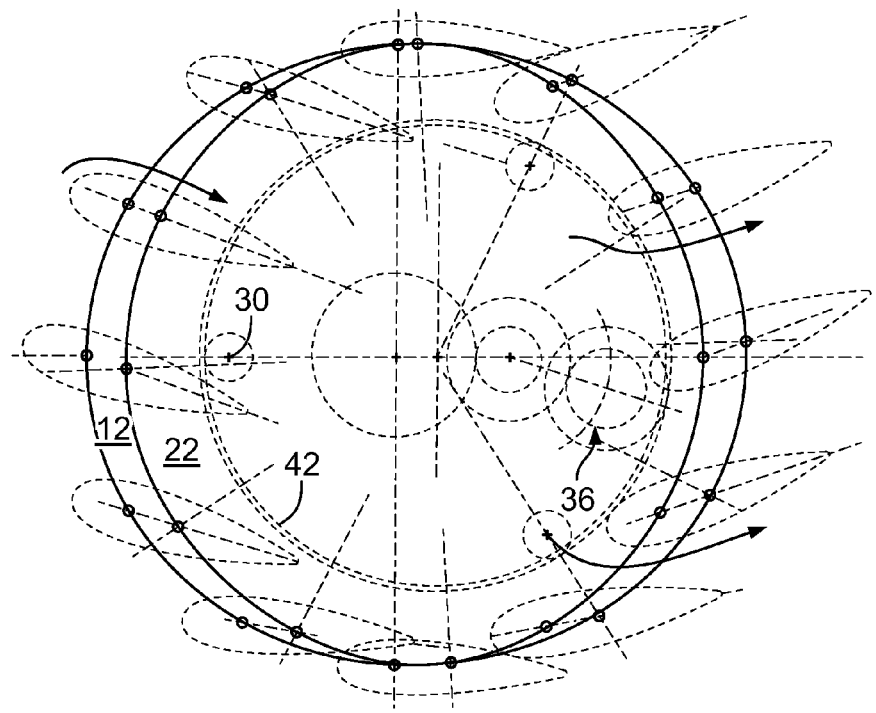
FIG. 4 depicts a plurality of airfoils employed in the device herein wherein advance of the displacement of the control plate results in a positioning of the airfoils in an angle of attack in a power mode.

As can be seen in FIG. 4, a windstream encountering the airfoils 18 on a leading side of the device 10 which is the thicker ends of the airfoils 18, will traverse the interior of the device 10 and engage upon the optimum angled trailing airfoils 18 on the opposite side of the device 10. The communicated power to the device 10 is increased by the proper angle of attack of the airfoils 18 on both sides of the path of the airstream provided by the continuum angle adjustment. The angular displacement of the control plate 22 by the vane 26 acting on the base plate 34 in concert with operation of the synchronisation mechanism engaged on the baseplate 34 during changes in the relative rotation speeds thereby provides the means to produce an optimum angle of attack for the airfoils 18 on both sides of the device 10 at all points of rotation of the airfoils 18 around the main axis.

In operation a preferred means for rotation synchronization is shown in one mode as the geared mechanism 36 of FIGS. 2-7 which depicts views of the geared mechanism 36 providing means of rotation of control plate 22 in a rotational engagement around the second or virtual axis 24 upon the base plate 34 using a plurality of idlers 30. A gear 31 (FIG. 2) on the drive shaft 14 is in operational communication with the circumferential gear 41, shown in FIG. 5, formed on the circular aperture 42 in the control plate 22. Advance and retardation of the rotation of the control plate 22 with the rotation of the main drive shaft 14 and engaged main plate 12 is provided by the gears in the system acting in concert as the vane 26 acts to rotate the base plate 34 and thereby translate the virtual axis 24 around the main axis 16. Synchronous rotation is thus maintained during the advance or retardation of the angular displacement of the control plate 22 relative to the main plate 12 during adjustments of airfoil 18 angle of attack by the control plate 22 displacement changes.

Synchronous rotation of the main plate 12 with the control plate 22 during advance or retard of the control plate 22 relative to the rotation of the main plate 12 can also be provided by a belt or chain driven system shown in FIG. 1 where a chain provides the operative communication between the gear 21 (FIG. 5) and the circumferential gear 41 or other means to maintain a synchronous rotation as would occur to those skilled in the art.

The method and components shown in the drawings and described in detail herein disclose arrangements of elements of particular construction, and configuration for illustrating preferred embodiments of structure of the presently disclosed vertical axis wind turbine. It is to be understood, however, that elements of different construction and configuration, and using different steps and process procedures, and other arrangements thereof, other than those illustrated and described, may be employed in accordance with the spirit of this invention.

As such, while the present invention has been described herein with reference to particular embodiments thereof, a latitude of modifications, various changes and substitutions are intended in the foregoing disclosure, and will be appreciated that in some instance some features of the invention could be employed without a corresponding use of other features, without departing from the scope of the invention as set forth in the following claims. All such changes, alternations and modifications as would occur to those skilled in the art are considered to be within the scope of this invention as broadly defined in the appended claims.

Further, the purpose of the provided abstract of the invention, is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting, as to the scope of the invention in any way.

What is claimed is:

1. A vertical axis wind turbine, comprising:
   a base plate disposed on a support surface and rotatable about a first axis;
   a drive plate rotatable about said first axis, said drive plate supporting a plurality of substantially upright vanes in a pivotal engagement and configured to act as airfoils;
   a drive shaft engaged to said drive plate, said drive shaft rotatable about said first axis;
   a control plate;
   means for rotatable engagement of said control plate upon said base plate;
   said control plate rotatable about a second axis substantially parallel and spaced apart from said first axis;
   means to synchronize rotation of said control plate around said second axis with concurrent rotations of said drive plate around said first axis;
   means for engagement of each respective vane to said control plate;
   means for rotatory positioning of said base plate about said first axis relative to wind direction; and
   wherein rotation of said control plate about said second axis in combination with said means for rotatory positioning during concurrent rotation with said drive plate pivots each of said vanes, thereby communicating a continuous pitch adjustment to said vanes, wherein said means for rotatable engagement of said control plate comprises:
   a plurality of idler gears projecting from a top surface of said base plate;
   an aperture formed in said control plate defined by a circumferential edge; and
   said edge toothed for an engagement with said idler gears.

2. The vertical axis wind turbine of claim 1 wherein said means to synchronize rotation of said control plate around said second axis with concurrent rotations of said drive plate around said first axis comprises:
   a first gear engaged to said drive shaft;
   a second gear rotatably engaged to said base plate and engaged with said first gear;
   a third gear rotatably engaged to said base plate, and communicating between said second gear and said toothed surface of said circumferential edge of said aperture; and
   ratios of teeth on said first, second, and third gears, with said toothed circumferential edge, adapted to provide a synchronization of rotation of said control plate with said drive plate.

3. The vertical axis wind turbine of claim 2 wherein said means for engagement of each respective vane to said control plate comprises:
   a respective control member engaged between each said vane and respective engagement points on said control plate;
   each control member in a rotational engagement at a first end to said vane;
   each control member rotationally engaged at a second end to said respective engagement points on said control plate; and
   said rotatory positioning of said base plate adjusting an angular displacement of said control plate relative to said drive plate thereby imparting a force through a respective said control member to pivot the said vane engaged thereto.

4. The vertical axis wind turbine of claim 2 wherein said means for rotatory positioning of said base plate about said first axis relative to wind direction comprises:
   a secondary vane engaged to said baseplate.

5. The vertical axis wind turbine of claim 4 wherein said means for engagement of each respective vane to said control plate comprises:
   a respective control member engaged between each said van and respective engagement points on said control plate;
   each control member in a rotational engagement at a first end to said vane;
   each control member rotationally engaged at a second end to said respective engagement points on said control plate; and
   said rotatory positioning of said base plate adjusting an angular displacement of said control plate relative to said drive plate thereby imparting a force through a respective said control member to pivot the said vane engaged thereto.

6. The vertical axis wind turbine of claim 1 wherein said means for rotatory positioning of said base plate about said first axis relative to wind direction comprises:
   a secondary vane engaged to said baseplate.

7. The vertical axis wind turbine of claim 6 wherein said means for engagement of each respective vane to said control plate comprises:
   a respective control member engaged between each said vane and respective engagement points on said control plate;
   each control member in a rotational engagement at a first end to said vane;
   each control member rotationally engaged at a second end to said respective engagement points on said control plate; and
   said rotatory positioning of said base plate adjusting an angular displacement of said control plate relative to said drive plate thereby imparting a force through a respective said control member to pivot the said vane engaged thereto.

8. The vertical axis wind turbine of claim 1 wherein said means for engagement of each respective vane to said control plate comprises:
   a respective control member engaged between each said vane and respective engagement points on said control plate;
   each control member in a rotational engagement at a first end to said vane;
   each control member rotationally engaged at a second end to said respective engagement points on said control plate; and
   said rotatory positioning of said base plate adjusting an angular displacement of said control plate relative to said drive plate thereby imparting a force through a respective said control member to pivot the said vane engaged thereto.

9. A vertical axis wind turbine, comprising:
a base plate disposed on a support surface and rotatable about a first axis;
a drive plate rotatable about said first axis, said drive plate supporting a plurality of substantially upright vanes in a pivotal engagement and configured to act as airfoils;
a drive shaft engaged to said drive plate, said drive shaft rotatable about said first axis;
a control plate comprising an aperture defined by a circumferential edge having a toothed surface;
means for rotatable engagement of said control plate upon said base plate;
said control plate rotatable about a second axis substantially parallel and spaced apart from said first axis;
means to synchronize rotation of said control plate around said second axis with concurrent rotations of said drive plate around said first axis;
means for engagement of each respective vane to said control plate;
means for rotatory positioning of said base plate about said first axis relative to wind direction; and
wherein rotation of said control plate about said second axis in combination with said means for rotatory positioning during concurrent rotation with said drive plate pivots each of said vanes, thereby communicating a continuous pitch adjustment to said vanes, wherein said means to synchronize rotation of said control plate around said second axis with concurrent rotations of said drive plate around said first axis comprises:
a first gear engaged to said drive shaft;
a second gear rotatably engaged to said base plate and engaged with said first gear;
a third gear rotatably engaged to said base plate, and communicating between said second gear and said toothed surface of said circumferential edge of said aperture; and
ratios of teeth on said first, second, and third gears, with said toothed circumferential edge, adapted to provide a synchronization of rotation of said control plate with said drive plate.

10. The vertical axis wind turbine of claim 9 wherein said means for rotatory positioning of said base plate about said first axis relative to wind direction comprises:
a secondary vane engaged to said baseplate.

11. The vertical axis wind turbine of claim 10 wherein said means for engagement of each respective vane to said control plate comprises:
a respective control member engaged between each said vane and respective engagement points on said control plate;
each control member in a rotational engagement at a first end to said vane;
each control member rotationally engaged at a second end to said respective engagement points on said control plate; and
said rotatory positioning of said base plate adjusting an angular displacement of said control plate relative to said drive plate thereby imparting a force through a respective said control member to pivot the said vane engaged thereto.

12. The vertical axis wind turbine of claim 9 wherein said means for engagement of each respective vane to said control plate comprises:
a respective control member engaged between each said vane and respective engagement points on said control plate;
each control member in a rotational engagement at a first end to said vane;
each control member rotationally engaged at a second end to said respective engagement points on said control plate; and
said rotatory positioning of said base plate adjusting an angular displacement of said control plate relative to said drive plate thereby imparting a force through a respective said control member to pivot the said vane engaged thereto.

13. A vertical axis wind turbine, comprising:
a base plate disposed on a support surface and rotatable about a first axis;
a drive plate rotatable about said first axis, said drive plate supporting a plurality of substantially upright vanes in a pivotal engagement and configured to act as airfoils;
a drive shaft engaged to said drive plate, said drive shaft rotatable about said first axis;
a control plate;
means for rotatable engagement of said control plate upon said base plate;
said control plate rotatable about a second axis substantially parallel and spaced apart from said first axis;
means to synchronize rotation of said control plate around said second axis with concurrent rotations of said drive plate around said first axis;
means for engagement of each respective vane to said control plate;
means for rotatory positioning of said base plate about said first axis relative to wind direction; and
wherein rotation of said control plate about said second axis in combination with said means for rotatory positioning during concurrent rotation with said drive plate pivots each of said vanes, thereby communicating a continuous pitch adjustment to said vanes, wherein said means for rotatory positioning of said base plate about said first axis relative to wind direction comprises:
a secondary vane engaged to said baseplate.

14. The vertical axis wind turbine of claim 13 wherein said means for engagement of each respective vane to said control plate comprises:
a respective control member engaged between each said vane and respective engagement points on said control plate;
each control member in a rotational engagement at a first end to said vane;
each control member rotationally engaged at a s second end to said to said respective engagement points on said control plate; and
said rotatory positioning of said base plate adjusting an angular displacement of said control plate relative to said drive plate thereby imparting a force through a respective said control member to pivot the said vane engaged thereto.

15. A vertical axis wind turbine, comprising:
a base plate disposed on a support surface and rotatable about a first axis;
a drive plate rotatable about said first axis, said drive plate supporting a plurality of substantially upright vanes in a pivotal engagement and configured to act as airfoils;
a drive shaft engaged to said drive plate, said drive shaft rotatable about said first axis;
a control plate;

means for rotatable engagement of said control plate upon said base plate;

said control plate rotatable about a second axis substantially parallel and spaced apart from said first axis;

means to synchronize rotation of said control plate around said second axis with concurrent rotations of said drive plate around said first axis;

means for engagement of each respective vane to said control plate;

means for rotatory positioning of said base plate about said first axis relative to wind direction; and wherein rotation of said control plate about said second axis in combination with said means for rotatory positioning during concurrent rotation with said drive plate pivots each of said vanes, thereby communicating a continuous pitch adjustment to said vanes, wherein said means for engagement of each respective van to said control plate comprises:

a respective control member engaged between each said vane and respective engagement points on said control plate;

each control member in a rotational engagement at a first end to said vane;

each control member rotationally engaged at a second end to said respective engagement points on said control plate; and said rotatory positioning of said base plate adjusting an angular displacement of said control plate relative to said drive plate thereby imparting a force through a respective said control member to pivot the said vane engaged thereto.

* * * * *